(12) United States Patent
Louie et al.

(10) Patent No.: US 11,886,173 B2
(45) Date of Patent: Jan. 30, 2024

(54) CONTINUOUS-LINE MANUFACTURING SYSTEM AND METHOD FOR AUTOMATED MACHINE ALLOCATION

(71) Applicant: The Boeing Company, Chicago, IL (US)

(72) Inventors: Michael K Louie, Renton, WA (US); Jordan S. Erickson, Federal Way, WA (US); Daniel R. Smith, Woodinville, WA (US)

(73) Assignee: The Boeing Company, Arlington, VA (US)

( * ) Notice: Subject to any disclaimer, the term of this patent is extended or adjusted under 35 U.S.C. 154(b) by 71 days.

(21) Appl. No.: 17/502,276

(22) Filed: Oct. 15, 2021

(65) Prior Publication Data

US 2022/0155763 A1 May 19, 2022

Related U.S. Application Data

(60) Provisional application No. 63/115,649, filed on Nov. 19, 2020.

(51) Int. Cl.
*G05B 19/418* (2006.01)
(52) U.S. Cl.
CPC .............. *G05B 19/4188* (2013.01); *G05B 2219/31001* (2013.01)
(58) Field of Classification Search
CPC ...... G05B 19/4188; G05B 2219/31001; G05B 2219/32015; G05B 19/41895;
(Continued)

(56) References Cited

U.S. PATENT DOCUMENTS 4,580,207 A    4/1986  Arai et al.
6,463,360 B1  10/2002  Terada et al.
(Continued)

FOREIGN PATENT DOCUMENTS

DE    10 2010032877    2/2012

OTHER PUBLICATIONS

European Patent Office, "Partial European Search Report," App. No. 212006779 (dated Mar. 1, 2022).
(Continued)

*Primary Examiner* — Christopher E. Everett
(74) *Attorney, Agent, or Firm* — Walters & Wasylyna LLC

(57) ABSTRACT

A method for employing a plurality of automated machines to deposit composite material includes a first tool located in a first station and a second tool located in a second station. The first station and the second station are located on a production line. The first station includes at least one automated machine of the plurality of automated machines and the second station includes at least two automated machines of the plurality of automated machines. At least one of the automated machines is movable from the second station to the first station. The method includes monitoring machine capacity and workload requirements of the plurality of automated machines. The method further includes determining an efficiency threshold based upon the machine capacity and workload requirements. The method further includes reallocating at least one of the automated machines from the second station to the first station once the efficiency threshold is met.

18 Claims, 11 Drawing Sheets

(58) Field of Classification Search
CPC .......... G05B 2219/31264; G05B 2219/31445; G05B 2219/32019; G05B 2219/32388; G05B 2219/32418; G05B 2219/33334; G05B 2219/40294; G05B 19/41845; G05B 19/41865; G05B 2219/32252; Y02P 90/60

See application file for complete search history.

(56) References Cited

U.S. PATENT DOCUMENTS

| | | | |
|---|---|---|---|
| 7,282,107 B2 | 10/2007 | Johnson et al. | |
| 7,527,222 B2 | 5/2009 | Biornstad et al. | |
| 2004/0122570 A1 | 6/2004 | Sonoyama et al. | |
| 2005/0247396 A1* | 11/2005 | Oldani | B29C 70/32 156/173 |
| 2015/0081043 A1 | 3/2015 | Kim et al. | |
| 2016/0176123 A1* | 6/2016 | Pedigo | B29C 70/382 264/258 |

OTHER PUBLICATIONS

Pearce et al: "Quantifying the effectiveness of load balance algorithms," *Proceedings of the 26th ACM International Conference on Supercomputing*, pp. 185-195 (Jan. 1, 2012).

Gagan et al: "The load rebalancing problem," *Annual ACM Symposium on Parallel Algorithms and Architectures*, pp. 258-265 (Jun. 7, 2003).

European Patent Office, "Extended European Search Report," App. No. 212006779 (dated Jun. 17, 2022).

D. Eustace et al.: "Co-Operant Mobile Robots for Advanced Manufacturing and Material Handling Applications," *Proceedings of the International Symposium on Automotive Technology and Automation (Isata)*, Florence, Italy, vol. SYMP. 24, pp. 443-450 (May 20, 1991).

C.W. Kim et al: "AGV dispatching based on workload balancing," *International Journal of Production Research*, vol. 37, No. 17, pp. 4053-4066 (Nov. 20, 1999).

Y.C. Ho et al.: "Zone design and control for vehicle collision prevention and load balancing in a zone control AGV system," *Computers and Industrial Engineering*, Pergamon, Amsterdam, NL, vol. 56, No. 1, pp. 417-432 (Feb. 1, 2009).

Sale et al: "Modeling AGV Systems Using Network Constructs," *Proceedings of the 1987 Winter Simulation Conference*, pp. 661-668 (Jan. 1, 1987).

Aized et al.: "Modelling and performance maximization of an integrated automated guided vehicle system using coloured Petri net and response surface methods," *Computers and Industrial Engineering*, Pergamon, Amsterdam, NL, vol. 57, No. 3 pp. 822-831 (Oct. 1, 2009).

P. Egbelu et al.: "Characterization of automatic guided vehicle dispatching rules," *International Journal of Production Research*, vol. 22, No. 3, pp. 359-374 (May 28, 1984).

\* cited by examiner

CONTINUOUS-LINE MANUFACTURING SYSTEM AND METHOD FOR AUTOMATED MACHINE ALLOCATION

PRIORITY

This application claims priority from U.S. Ser. No. 63/115,649 filed on Nov. 19, 2020.

FIELD

The present disclosure generally relates to manufacturing and, more particularly, to continuous flow manufacturing systems and associated methods and processes for controlling automated machine sharing along a continuous flow production line.

BACKGROUND

Conventional manufacturing techniques for large parts, such as spars, fuselage sections, wing structures, and other aircraft structures, utilize large fixed-base machines and model-specific, fixed-base tooling. Conventional manufacturing techniques for composite parts utilize fixed-base tooling and batch processing, in which the composite part does not move from one location to another location until full lamination of the part is complete and further in which machines are stationary. Neither of these manufacturing techniques lend themselves to continuous flow manufacturing or efficient allocations of machines.

Accordingly, those skilled in the art continue with research and development efforts in the field of continuous flow manufacturing, particularly in the manufacture of large parts and/or composite parts, and, as such, systems, processes, and methods intended to address the above-identified concerns would find utility.

SUMMARY

Disclosed is a method for employing a plurality of automated machines on a production line.

In one example, the disclosed method for employing a plurality of automated machines to deposit composite material includes a first tool located in a first station and a second tool located in a second station. The first station and the second station are located on a production line. The first station includes at least one automated machine of the plurality of automated machines and the second station includes at least two automated machines of the plurality of automated machines. At least one of the automated machines is movable from the second station to the first station. The method includes monitoring machine capacity and workload requirements of the plurality of automated machines. The method further includes determining an efficiency threshold based upon the machine capacity and workload requirements. The method further includes reallocating at least one of the automated machines from the second station to the first station once the efficiency threshold is met.

Also disclosed is a manufacturing system for depositing composite material onto two or more tools using two or more automated machines.

In one example, the manufacturing system includes a production line, a first station located on the production line, a first tool located in the first station, a second station located on the production line, a second tool located in the second station, a plurality of automated machines distributed between the first station and the second station, at least one of the plurality of automated machines being movable between the first station and the second station, and a controller configured to monitor machine capacity and workload requirements of the plurality of machines. The controller may be configured to reallocate one or more of the plurality of automated machines between the first station and the second station.

Also disclosed is a process for distributing automated machines between a plurality of tools.

In one example, the process includes defining automated machines dedicated to a specific station, based on the minimum number of automated machines or minimum workload requirements. The process further includes defining automated machines configured to travel between stations to complete the workload requirements based on the maximum difference in workload requirements between two or more adjacent stations. In an example, the process further includes measuring statistics of each station and tool, communicating the statistics to a controller, measuring variables from a numerical control program in each automated machine, compiling data measured of total machine capacity and total workload requirements, and reallocating automated machines to areas that have unmet workload requirements.

Also disclosed is a system for fabrication using multiple stations.

In one example, the disclosed system includes a production line comprising a first station comprising a first tool and a second station comprising a second tool, a plurality of automated machines distributed between the first station and the second station, and a controller configured to determine a location of the plurality of automated machines based upon compiled statistics for the first station and the second station, and further configured to compare variables of the plurality of automated machine.

BRIEF DESCRIPTION OF THE DRAWINGS

Some examples of the present disclosure are described with reference to the accompanying drawings. The same reference number represents the same element or the same type of element on all drawings.

DETAILED DESCRIPTION

Figure 1:
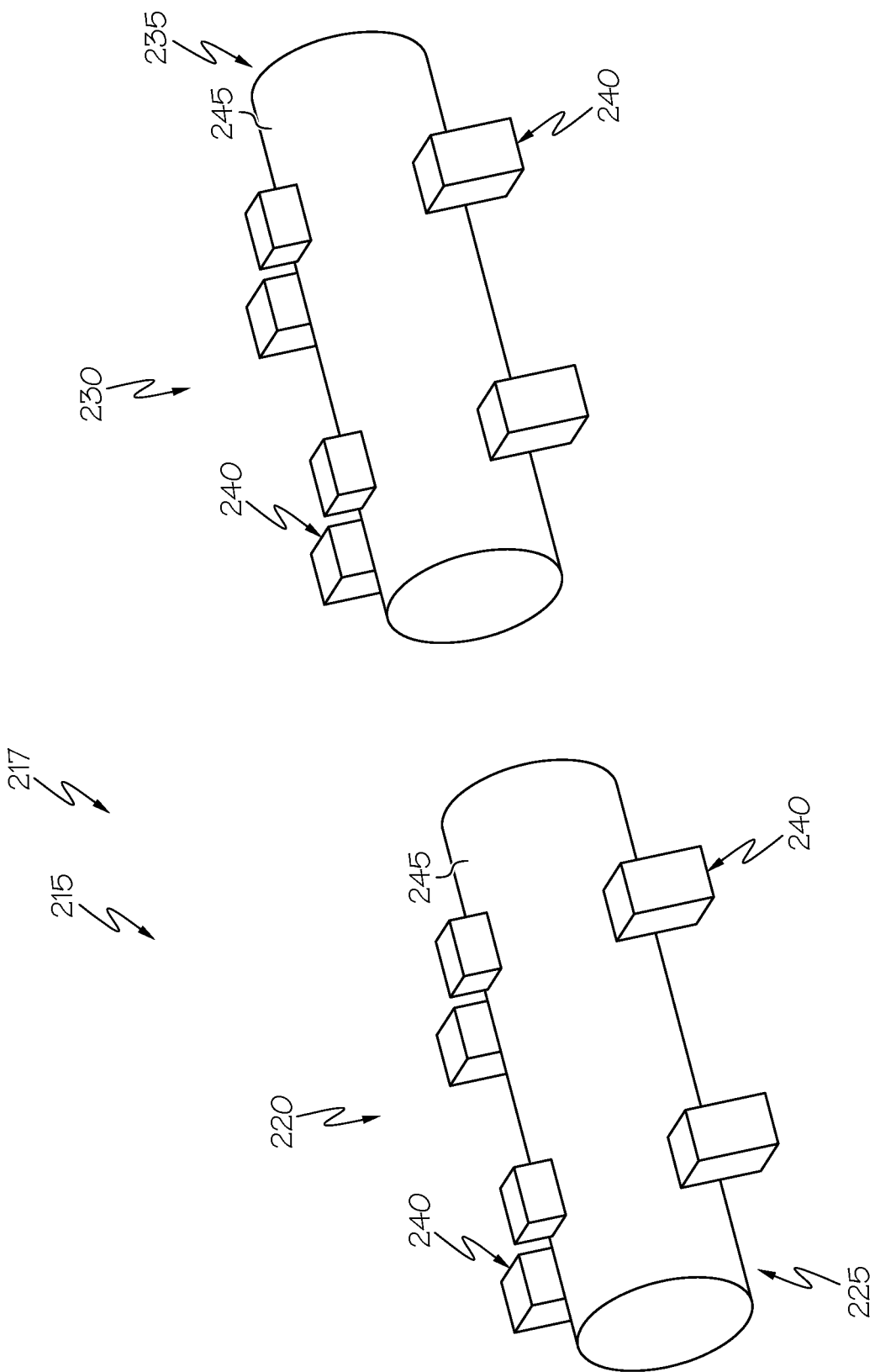
FIG. 1 is a perspective view of an example of a first station and a second station of a manufacturing system.
Figure 2:
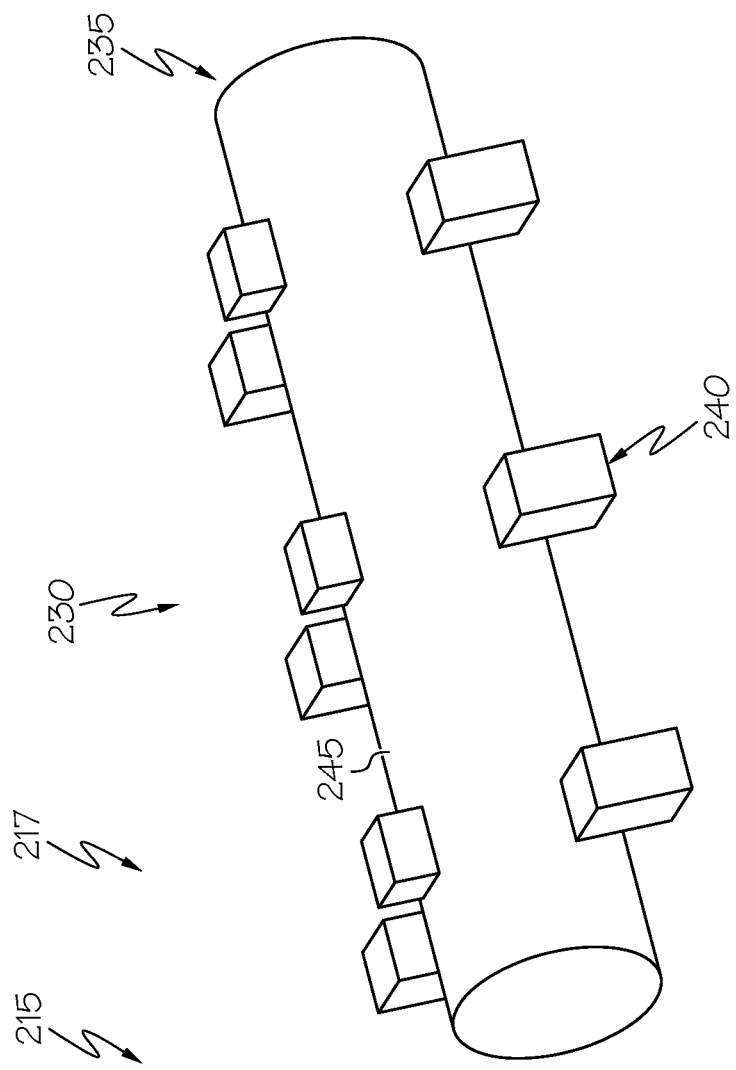
FIG. 2 is a perspective view of an example of a first station and a second station of a manufacturing system.
Figure 2:
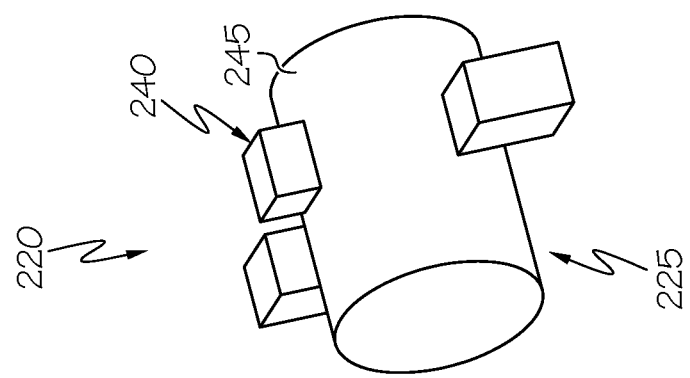

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about," "approximately," and "generally" refer to or represent a condition that is close to, but not exactly, the stated condition that still performs the desired function or achieves the desired result. As an example, the terms "about," "approximately," and "generally" refer to a condition that is within an acceptable predetermined tolerance or accuracy. For example, the terms "about," "approximately," and "generally" refer to a condition that is within 10% of the stated condition. However, the terms "about," "approximately," and "generally" do not exclude a condition that is exactly the stated condition.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Continuous flow manufacturing is a process in which a product is manufactured, from start to finish, in one production line. Continuous flow manufacturing is considered by most leading manufacturing experts to be the most efficient manufacturing method. Continuous flow manufacturing is advantageous over conventional batch production techniques in which a product is fully manufactured in a single manufacturing cell or a product is partially manufactured in one independent manufacturing cell, then is moved to another independent manufacturing cell for follow-on manufacturing. The benefits and advantages of continuous flow manufacturing include, but are not limited to, decreased work in progress requirements, decreased floor space requirements, reduced inventory, improved efficiency, reduced product rework, and reduced cycle time.

Continuous flow manufacturing requires the integration of the various elements of the production system and process to achieve continuous movement of the workpieces through the system without separating them into lots or batches. Continuous flow manufacturing also needs to quickly and accurately move tools, workpieces, and machines from one position to another and manage process-related information along the process flow path to achieve consistent quality and repeatable processing times.

Referring generally to FIGS. 1-10, by way of examples, the present disclosure is directed to manufacturing system 200, a method 100 for employing a plurality of automated machines 240, a system 300 for distributing a plurality of automated machines 240, and a process 400 for distributing automated machines 240 between a plurality of tools 295. The manufacturing system 200 facilitates continuous production of two or more workpieces 217, in which the workpieces 217 move from one work process or station to another in a single sequential flow of a production line 160 (i.e., continuous flow manufacturing) and in which the plurality of automated machines 240 are allocated across each station based upon several variables as shown and described herein.

The manufacturing system 200, method 100 for employing a plurality of automated machines 240, system 300 for distributing the plurality of automated machines 240, and process 400 disclosed herein utilize a controller 250 to perform process management. Controller 250 records and tracks process-related information, such as tool information, workpiece information, information related to the plurality of automated machines 240, and other work process information. Recordation occurs at each stage of a continuous manufacturing process and makes such process-related information available throughout the entire production line 210. One or more numerical control programs 258 may be utilized to facilitate process-related information and movement throughout the manufacturing system 200 and related processes, methods, and systems.

The manufacturing system 200, method 100 for employing a plurality of automated machines 240, system 300 for distributing a plurality of automated machines 240, and process 400 update the process-related information at each stage of the continuous manufacturing process. This may be done so by tracking movement of workpieces 217 from stage to stage, i.e., station to station, throughout the continuous manufacturing process and production line 210, and associating the process-related information with the corresponding workpiece 135.

The manufacturing system 200, method 100 for employing a plurality of automated machines 240, system 300 for distributing the plurality of automated machines 240, and process 400 direct production. This is accomplished by various means including by determining and retrieving the required inputs, the required work processes, and the generated outputs at each stage of the continuous manufacturing process that correspond to the workpieces 217. One or more sensors 290 may be utilized to collect such information. Data collected from the one or more sensors 290 may be analyzed and used to direct production.

The manufacturing system 200 advantageously tracks, manages, and controls the flow of information, work processes, automated machines 240, and workpieces 217 within the manufacturing system 200. The manufacturing system 200 facilitates use of continuous flow manufacturing for various types of workpieces 217, such as those that were conventionally not suited for continuous flow manufacturing. The manufacturing system 200 further facilitates appropriate allocation of automated machines 240 to maximize efficiency.

The manufacturing system 200, method 100 for employing a plurality of automated machines 240, system 300 for distributing a plurality of automated machines 240, and process 400 disclosed herein facilitate communication between the various manufacturing stages of the process by maintaining process-related information throughout the production line 210 of the continuous manufacturing process. The manufacturing system 200 and method 100 disclosed herein facilitate continuous flow manufacturing of large parts, such as spars, fuselage sections, wing structures, and other aircraft structures, and/or composite parts by identifying and accurately locating non-fixed-base tooling throughout the continuous manufacturing process. The manufacturing system 200 and method 100 disclosed herein further facilitate continuous flow manufacturing of large parts and/or composite parts by updating the process-related information at each manufacturing stage and transferring the process-related information throughout the continuous manufacturing processes. The manufacturing system 200 and method 100 disclosed herein facilitate continuous flow manufacturing by reallocating automated machines 240 to balance any uneven load and, if moving in pulses, maintain even pulse times and tack times. The workpieces 217 may move in pulses, being the full length of the workpieces 217, in micro pulses, being less than the full length of the workpieces 217, or continuously.

In one or more examples, the disclosure includes a manufacturing system 200. The disclosure further includes a method 100 for employing a plurality of automated machines 240. The disclosure further includes a system 300 for distributing the plurality of automated machines 240. The disclosure further includes a process 400. All of the above-mentioned disclosures may be used to facilitate manufacturing of composite parts, i.e. workpieces 217. Composite parts, such as carbon fiber reinforcement polymer parts, are initially laid-up in multiple layers that together are referred to as a laminate or "preform." Individual fibers within each layer of the laminate are aligned parallel with each other, but different layers may exhibit different fiber orientations in order to increase the strength of the resulting composite part along different dimensions. The laminate may include a viscous resin that solidifies in order to harden the laminate into a composite part (e.g., for use in an aircraft). In an example, an automated machine 240 of the manufacturing system 200, method 100 for employing a plurality of automated machines 240, system 300 for distributing a plurality of automated machines 240, and process 400 is configured to perform at least one manufacturing operation 245. The manufacturing operation 245 may include laying down a plurality of composite plies of composite material 247 at various orientations as determined by one or more numerical control programs 258.

Figure 4:
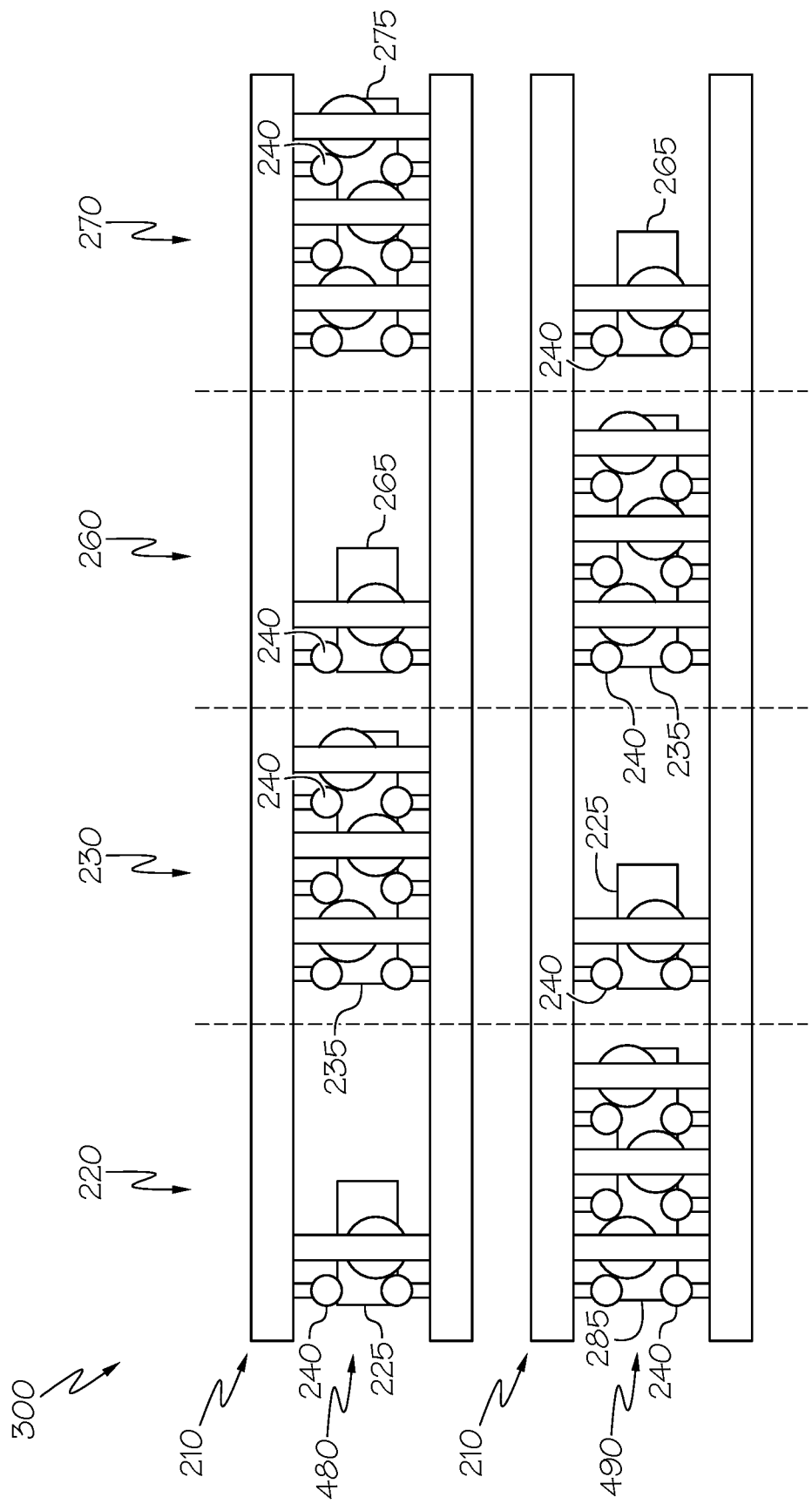
FIG. 4 is a schematic diagram of a manufacturing system in an illustrative example.
Figure 5:
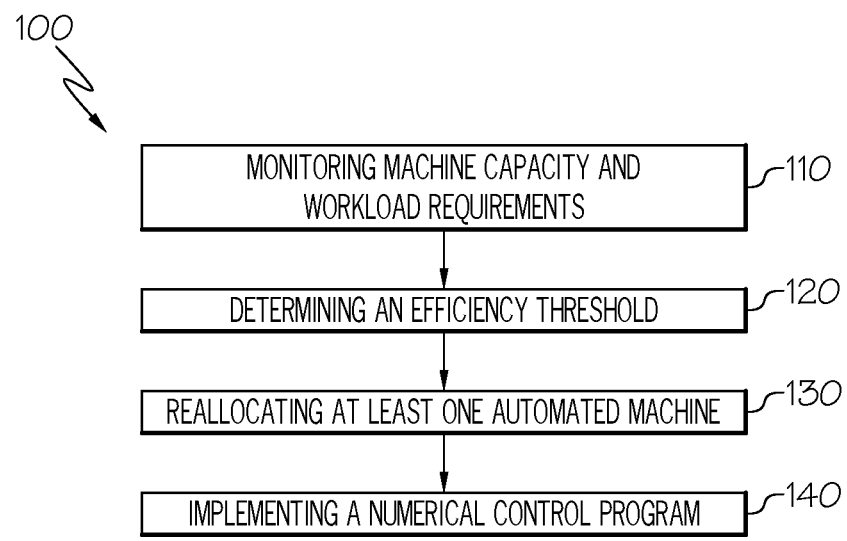
FIG. 5 is a flowchart illustrating a method for employing a plurality of machines to deposit composite material.

Referring to FIG. 5, a method 100 is disclosed. Method 100 may be directed to employing a plurality of automated machines 240 to deposit composite material 247 onto a first tool 225 as illustrated in FIGS. 1-4 and 6. The first tool 225 may be located in a first station 220. The method 100 may further be directed to employing a plurality of automated machines 240 to deposit composite material 247 onto a second tool 235 located in a second station 230. In an example, the first station 220 and the second station 230 may be located on a production line 210. The production line may include a rail 219, see FIG. 6. The first station 220 includes at least one automated machine 240*a* of the plurality of automated machines 240 and the second station 230 includes at least two automated machines of the plurality of automated machines 240.

In an example, at least one of the automated machines 240 is movable from the second station 230 to the first station 220. In an example, at least one automated machine 240*a* of the plurality of automated machines 240 may be movable between different zone locations 280. In an example, the first station 220 includes at least two automated machines 240*a* from the plurality of automated machines 240 and the second station 230 includes at least one automated machine 240*a* from the plurality of automated machines 240. In an example, at least one of the automated machines 240 is movable from the first station 220 to the second station 230. In an example, the first tool 225 and the second tool 235 are approximately the same size, see FIG. 1. In an example, the first tool 225 and the second tool 235 are different sizes such that each requires a different number of automated machines 240*a* to complete the workload requirements 254, see FIG. 2.

Figure 3:
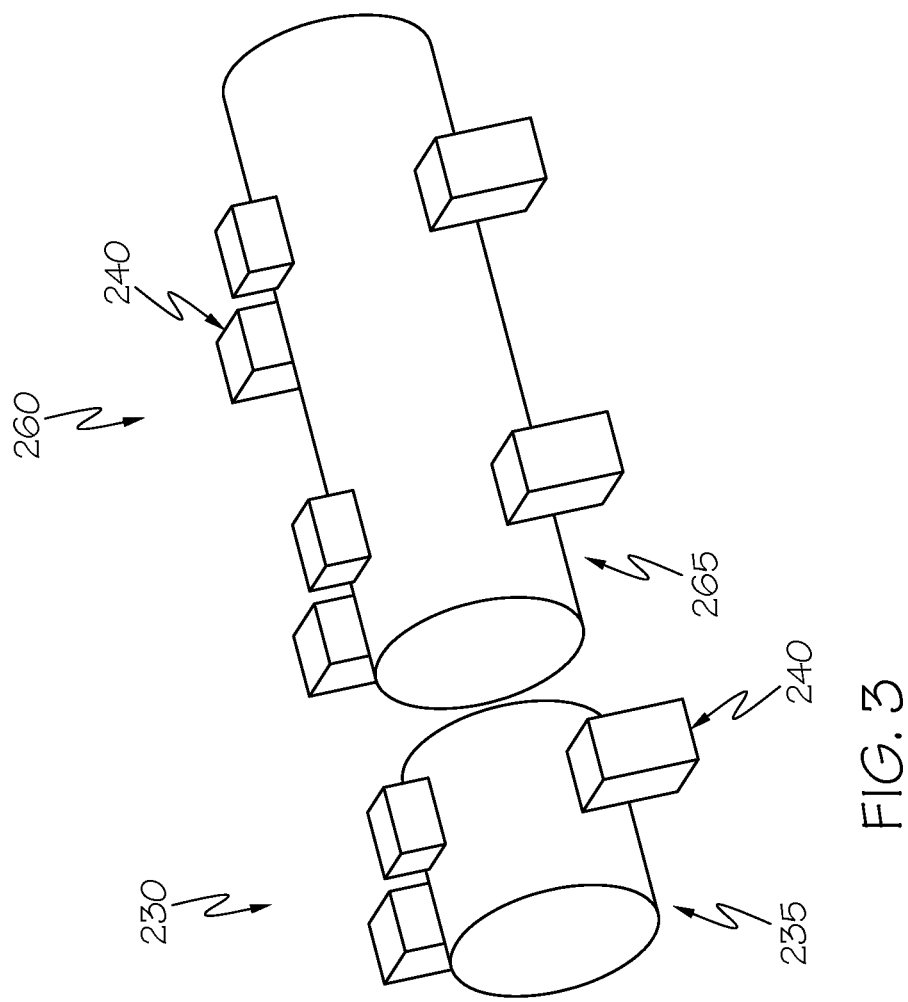
FIG. 3 is a perspective view of an example of a first station and a second station of a manufacturing system.
Figure 3:
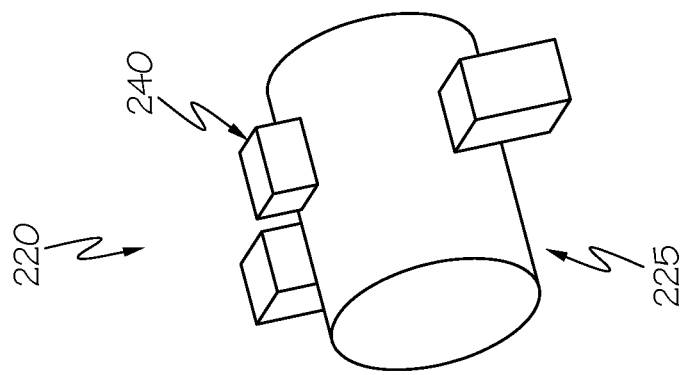

The method 100 may further be directed to employing a plurality of automated machines 240 to deposit composite material 247 onto a first tool 225, a second tool 235, and a third tool 265, FIG. 3. Third tool 265 may be located in a third station 260. Third station 260 may be located along the production line 210 and adjacent to second station 230. The third station 260 may include at least two automated machines 240*a* of the plurality of automated machines 240. At least one of the automated machines 240*a* of the plurality of automated machines 240 may be movable between the third station 260, the second station 230, and the first station 220.

The method 100 may further be directed to employing a plurality of automated machines 240 to deposit composite material 247 onto a first tool 225, a second tool 235, a third tool 265, and a fourth tool 275, FIG. 4. Fourth tool 275 may be located in a fourth station 270. Fourth station may be located along the production line 210 and adjacent to third station 260. The fourth station 270 may include at least two automated machines 240. At least one automated machine 240*a* of the plurality of automated machines 240 may be movable between the fourth station 270, third station 260, the second station 230, and the first station 220. In an example, at least one of the plurality of automated machines 240 may be movable between different zone locations 280 located on the first tool 225, second tool 235, third tool 265, and fourth tool 275.

In one or more examples, the method 100 may include monitoring 110 machine capacity 252 and workload requirements 254 of the plurality of automated machines 240. A controller 250 may utilize one or more global positioning systems (GPS) 510, sensors 290, lasers 520, numerical control programs 258, barcode 530, or any other suitable means of collecting machine capacity 252 and workload requirements 254 data for determining 120 an efficiency threshold 256 of optimal allocation of the plurality of automated machines 240.

Figure 6:
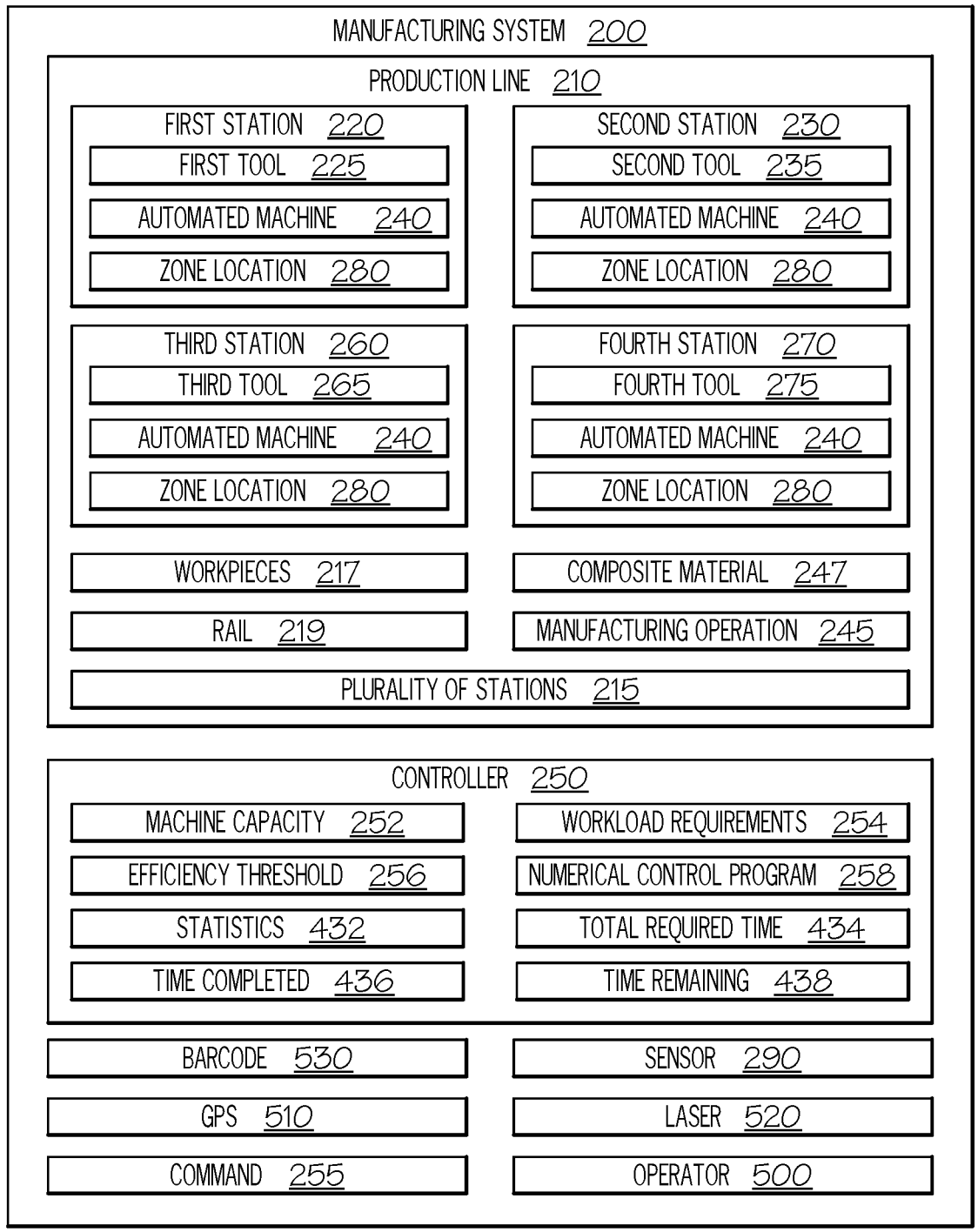
FIG. 6 is a block diagram of a manufacturing system that can be used with the method of FIG. 5.
Figure 11:
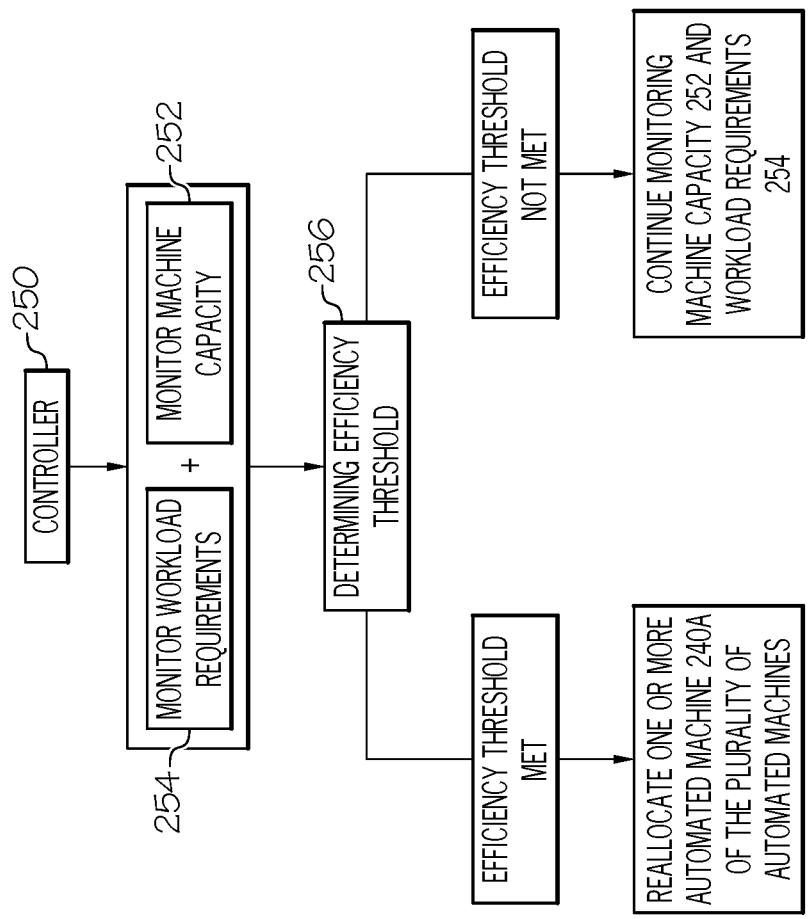
FIG. 11 is a flow diagram illustrating a method for distributing automated machines between a plurality of tools.

In one or more examples, the method 100 may include determining 120 an efficiency threshold 256 based upon the machine capacity 252 and workload requirements 254, see FIG. 6 and FIG. 11. The controller 250 may be configured to monitor the machine capacity 252 and workload requirements 254 of the plurality of automated machines 240. The controller 250 may compile statistics 432 including measuring total required time 434, time completed 436, time remaining 438, and zone location 280 when monitoring 110 and determining 120 an efficiency threshold 256. In an example, all of the plurality of automated machines 240 are configured with a controller 250 that is cloud-based. In an example, the controller 250 that is cloud-based utilizes the same one or more numerical control programs 258 to evaluate factors such as interference among the plurality of automated machines 240 and implement collision avoidance systems among the plurality of automated machines 240. In an example, the controller 250 that is cloud-based utilizes the same one or more numerical control programs 258 to evaluate layups of composite material 247 for collecting data related to total weight of the composite material 247, total length of the composite material 247, courses of the composite material 247, etc. to determine optimal distribution of the plurality of automated machines 240 within a zone location 280 on one or more workpieces 217 and among the plurality of stations 215.

In an example, the controller 250 is configured to control movement of the plurality of automated machines 240. In an example, the controller 250 is configured to reallocate one or more automated machine 240a of the plurality of automated machines 240 between the first station 220 and the second station 230. In other words, the controller 250 reallocates the automated machines 240a. In an example, the controller 250 is configured to reallocate one or more automated machine 240a of the plurality of automated machines 240 between any of the plurality of stations 215. In an example, the controller 250 is configured to reallocate one or more automated machine 240a of the plurality of automated machines 240 between any of the zone locations 280 throughout the production line 210. The controller 250 may reallocate one or more automated machine 240a of the plurality of automated machines 240 based upon monitored capacity 252 and workload requirements 254 of the plurality of automated machines 240.

In one or more examples, the method 100 may include reallocating 130 at least one automated machine 240a of the plurality of automated machines 240 from the second station 230 to the first station 220 once the efficiency threshold 256 is met. In an example, the controller 250 may utilize one or more numerical control programs 258 or input received from an operator 500 in conjunction with the data collected from one or more sensors 290, barcode, global positioning systems (GPS) 510, and lasers 520 to determine the efficiency threshold 256. Once the efficiency threshold 256 is satisfied, the controller 250 may transmit a command 255 to initiate reallocating 130 one or more automated machines 240 between the first station 220, second station 230, or any one of the plurality of stations 215, see FIG. 1.

Referring to FIGS. 1-4 and 6, in one or more examples, a manufacturing system 200 includes at least one production line 210. The production line 210 may include a plurality of stations 215. Among the plurality of stations 215 may be a first station 220 and a second station 230. Each of the plurality of stations 215 may be configured to house one or more automated machines 240 and one or more workpieces 217. Each of the one or more workpieces 217 may have one or more zone location 280 where one or more automated machine 240a is temporarily dedicated to a particular zone location 280 until it has completed at least one manufacturing operation 245 in that zone location 280. The production line 210 may include a rail 219 or any other means of transportation. The rail 219 may be configured to transport tools, automated machines 240, or any other items along the production line 210 and between the plurality of stations 215.

In an example, a first tool 225 may be located in the first station 220. The first tool 225 may be a mandrel 227. The mandrel 227 may be configured to hold a first workpiece 229. First workpiece 229 may be a fuselage section, wing structure, or any other aircraft structure. First workpiece 229 may be comprised of a plurality of plies of composite material 247 at various orientations as determined by one or more numerical control programs 258. First workpiece 229 may include one or more zone location 280. At least one automated machine 240a may be temporarily dedicated to each zone location 280 on first workpiece 229.

In an example, a second tool 235 may be located in the second station 230. The second tool 235 may be a mandrel 227. The mandrel 227 may be configured to hold a second workpiece 239. Second workpiece 239 may be a fuselage section, wing structure, or any other aircraft structure. Second workpiece 239 may be comprised of a plurality of plies of composite material 247 at various orientations as determined by one or more numerical control programs 258. Second workpiece 239 may include one or more zone location 280. At least one automated machine 240a may be temporarily dedicated to each zone location 280 on second workpiece 239.

In an example, the manufacturing system 200 includes a plurality of automated machines 240 distributed between the first station 220, second station 230, and any of the plurality of stations 215. At least one automated machine 240a of the plurality of automated machines 240 may be movable between the plurality of stations 215. In an example, at least one automated machine 240a of the plurality of automated machines 240 may be movable between different zone locations 280. In an example, at least one automated machine 240a of the plurality of automated machines 240 is movable between the first station 220 and the second station 230. The plurality of automated machines 240 may be configured to perform at least one manufacturing operation 245. In one or more examples, at least one of the plurality if automated machines 240 may be an automated fiber placement machine configured to deposit composite material 247. The plurality of automated machines 240 may be configured to deposit composite material 247 onto the one or more workpieces 217. The plurality of automated machines 240 may be temporarily dedicated to specific zone locations 280 located on the one or more workpieces 217.

In an example, the manufacturing system 200 includes a controller 250. Controller 250 may be configured to monitor a machine capacity 252 and workload requirements 254 of the plurality of automated machines 240. In an example, the controller 250 is configured to control movement of the plurality of automated machines 240. In an example, the controller 250 is configured to reallocate one or more automated machine 240a of the plurality of automated machines 240 between the first station 220 and the second station 230. In an example, the controller 250 is configured to reallocate one or more of the plurality of automated machines 240 between any of the plurality of stations 215. In an example, the controller 250 is configured to reallocate one or more automated machine 240a of the plurality of automated machines 240 between any of the zone locations 280 throughout the production line 210. The controller 250 may reallocate one or more automated machine 240a of the plurality of automated machines 240 based upon monitored capacity 252 and workload requirements 254 of the plurality of automated machines 240.

The controller 250 may utilize one or more global positioning systems (GPS) 510, sensors 290, lasers 520, numerical control programs 258, barcode 530, or any other suitable means of collecting machine capacity 252 and workload requirements 254 data and determining optimal allocation of the plurality of automated machines 240. The controller 250 may be configured to transmit a command 255 to one or more of the plurality of automated machines 240. The command 255 may include instructions regarding allocation, movement, and workload requirements 254 of the plurality of automated machines 240. In an example, the command 255 may be transmitted wirelessly. In an example, the command 255 may be generated manually via an operator 500.

The manufacturing system 200 may include one or more sensors 290. Controller 250 may be configured to receive and analyze data collected from the one or more sensors 290. The controller 250 may further utilize the data received from the one or more sensors 290 in conjunction with one or more numerical control programs 258 to facilitate movement, monitor machine capacity 252, and monitor workload requirements 254 of the plurality of automated machines 240. The controller 250 may utilize the data collected to determine an optimal allocation of the plurality of automated machines 240.

The one or more sensors 290 may be located on one or more automated machine 240a of the plurality of automated machines 240, the first tool 225, the second tool 235, or anywhere throughout the first station 220 and second station 230 along the production line 210 of the manufacturing system 200. The one or more sensors 290 may be in communication with the controller 250. In an example, the one or more sensors 290 may be in wireless communication with the controller 250. In an example, the controller 250 may utilize one or more numerical control programs 258 or input received from an operator 500 in conjunction with the data collected from the one or more sensors 290, barcode 530, global positioning systems (GPS) 510, and lasers 520 to determine the efficiency threshold 256. Once the efficiency threshold 256 is satisfied, the controller 250 may transmit a command 255 to reallocate one or more automated machines 240 between the first station 220, second stations 230, or any one of the plurality of stations 215.

FIG. 3 illustrates an example of a manufacturing system 200 having three stations. In an example, the manufacturing system 200 includes a third station 260 located on the production line 210. The third station 260 may be configured to house a third tool 265. Third tool 265 may be a mandrel 227. The mandrel 227 may be configured to hold a third workpiece 269, see FIG. 7. Third workpiece 269 may be a fuselage section, wing structure, or any other aircraft structure. Third workpiece 269 may be comprised of a plurality of plies of composite material 247 at various orientations as determined by one or more numerical control programs 258. Third workpiece 269 may include one or more zone location 280. At least one automated machine 240 may be temporarily dedicated to each zone location 280 on third workpiece 269.

Third station 260 may include at least one of a plurality of automated machines 240. The at least one automated machine 240a of the plurality of automated machines 240 may be an automated fiber placement machine configured to deposit composite material 247 on the third tool 265. Third station 260 may include one or more sensors 290. The one or more sensors 290 may be located on an automated machine 240a, third tool 265, or anywhere throughout the third station 260. In an example, the one or more sensors 290 may be in communication with a controller 250.

In an example, controller 250 may be configured to receive and analyze data collected from the one or more sensors 290 located throughout the third station 260. The controller 250 may utilize the data collected from the one or more sensors 290 along or in conjunction with one or more numerical control program 258 to analyze monitored capacity 252 and workload requirements 254 of the one or more of the plurality of automated machines 240 located in the third station 260.

FIG. 4 illustrates a manufacturing system 200 having four stations. In an example, the manufacturing system 200 includes a fourth station 270 located on the production line 210. The fourth station 270 may be configured to house a fourth tool 275. Fourth tool 275 may be a mandrel 227. The mandrel 227 may be configured to hold a fourth workpiece 279, see FIG. 7. Fourth workpiece 279 may be a fuselage section, wing structure, or any other aircraft structure. Fourth workpiece 279 may be comprised of a plurality of plies of composite material 247 at various orientations as determined by one or more numerical control programs 258. Fourth workpiece 279 may include one or more zone location 280. At least one automated machine 240 may be temporarily dedicated to each zone location 280 on fourth workpiece 279.

Fourth station 270 may include at least one of a plurality of automated machines 240. The at least one automated machine 240a of the plurality of automated machines 240 may be an automated fiber placement machine configured to deposit composite material 247 on the fourth tool 275. Fourth station 270 may include one or more sensors 290. The one or more sensors 290 may be located on an automated machine 240, fourth tool 275, or anywhere throughout the fourth station 270. In an example, the one or more sensors 290 may be in communication with a controller 250.

In an example, controller 250 may be configured to receive and analyze data collected from the one or more sensors 290 located throughout the third station 260. The controller 250 may utilize the data collected from the one or more sensors 290 along or in conjunction with one or more numerical control program 258 to analyze monitored capacity 252 and workload requirements 254 of the one or more automated machine 240a of the plurality of automated machines 240 located in the fourth station 270. The controller 250 may compile statistics 432 including measuring total required time 434, time completed 436, time remaining 438, and zone location 280 when analyzing monitored capacity 252 and workload requirements 254 to determine an efficiency threshold 256. In an example, the controller 250 is configured to reallocate one or more automated machine 240a of the plurality of automated machines 240 between any of the zone locations 280 throughout the production line 210. In an example, the controller 250 is configured to reallocate one or more automated machine 240a of the plurality of automated machines 240 between any of the plurality of stations 215 throughout the production line 210.

FIG. 4 illustrates four stations along production line 210 and the movement of workpieces 217 along the production line 210. The upper row 480 illustrates production line 210 at one point in time having a first station 220 housing a first tool 225, a second station housing a second tool 235, a third station 260 housing a third tool 265, and a fourth station 270 housing a fourth tool 275. In this example, the first station 220 houses two automated machines 240a, the second station 230 houses six automated machines 240a, the third station houses two automated machines 240a, and the fourth station houses six automated machines 240a. The number of automated machines 240a in each station may be based upon several factors including the size of the workpieces 217, one or more numerical control programs 258, and data collected by the controller 250.

The lower row 490 of FIG. 4 illustrates an example of reallocation of the automated machines 240a at a different point in time as the workpieces 217 move to a different station along the production line 210. In an example, first tool 225 moved from first station 220 to second station 230, second tool 235 moved from second station 230 to third station 260, third tool 265 moved from third station 260 to fourth station 270, fourth tool 275 moved out of fourth station 270 and a fifth tool 285 moved into first station 220. In this example, first station 220 houses six automated machines 240a, second station 230 houses two automated machines 240a, third station 260 houses six automated machines 240a, and fourth station 270 houses two automated machines 240a. The automated machines 240a were reallocated between the stations 215 based upon several factoring including workload requirements 254 of the new workpieces 217 in each station.

In an example, as illustrated in FIG. 4, the automated machines 240 may move between stations while the workpieces 217 are moving along the production line 210. Each automated machine 240a may be assigned to a particular zone location 280 on the workpiece 217. Once an automated machine 240 has completed the at least one manufacturing operation 245 of a particular zone location 280, it may move to a new zone location 280 on the same workpiece 217 or on a different workpiece 217 located in a different station. Movement of the automated machines 240a may be based upon a command 255 from a controller 250, manual instructions from an operator 500, or a combination thereof.

Controller 250 may utilize data collected from one or more global positioning systems (GPS) 510, lasers 520, numerical control programs 258, barcode 530, or any other suitable means of collecting machine capacity 252 and workload requirements 254 data and determining optimal allocation of the plurality of automated machines 240. Based upon the machine capacity 252 and workload requirements 254, an efficiency threshold 256 may be determined. In an example, the controller 250 may utilize one or more numerical control program 258 or input received from an operator 500 in conjunction with the data collected from the one or more sensors 290, barcode 530, global positioning systems (GPS) 510, and lasers 520 to determine the efficiency threshold 256. The controller 250 may further compile statistics 432 (i.e., the "compiled statistics") including measuring total required time 434, time completed 436, time remaining 438, and zone location 280 when analyzing monitored capacity 252 and workload requirements 254 to determine an efficiency threshold 256.

Once the efficiency threshold 256 is satisfied, the controller 250 may transmit a command 255 to reallocate one or more automated machines 240a between the first station 220, second stations 230, third station 260, fourth station 270, or any one of the plurality of stations 215.

In an example, the first tool 225, second tool 235, third tool 265, fourth tool 275, and any subsequent tools may be configured to move in pulses along the production line 210. A pulse is equivalent to movement of the full length of a workpiece, such as a first workpiece 229 of first tool 225. In an example, the first tool 225, second tool 235, third tool 265, fourth tool 275, and any subsequent tools may be configured to move continuously along the production line 210. In an example, the plurality of automated machines 240 may be configured to perform the at least one manufacturing operation 245 while the first tool 225, second tool 235, third tool 265, fourth tool 275, and/or any subsequent tools move in pulses. In an example, the plurality of automated machines 240 may be configured to perform the at least one manufacturing operation 245 while the first tool 225, second tool 235, third tool 265, fourth tool 275, and/or any subsequent tools move continuously.

In an example, one or more automated machine 240a of the plurality of automated machines 240 may be configured to perform at least one manufacturing operation 245 while being reallocated from one station to another. In an example, one or more automated machine 240a of the plurality of automated machines 240 may be configured to perform at least one manufacturing operation 245 while being reallocated from the first station 220 to the second station 230 such that the automated machine 240a may deposit composite material 247 on the first tool 225 while moving to the second station 230 and pause until reaching the second tool 235 in the second station 230 before resuming the at least one manufacturing operation 245. In an example, one or more of the plurality of automated machines 240 may be configured to perform at least one manufacturing operation 245 while being reallocated from one zone location 280 to another. Zone location 280 may be defined by any portion of a workpiece 217 to receive composite material 247.

Figure 7:
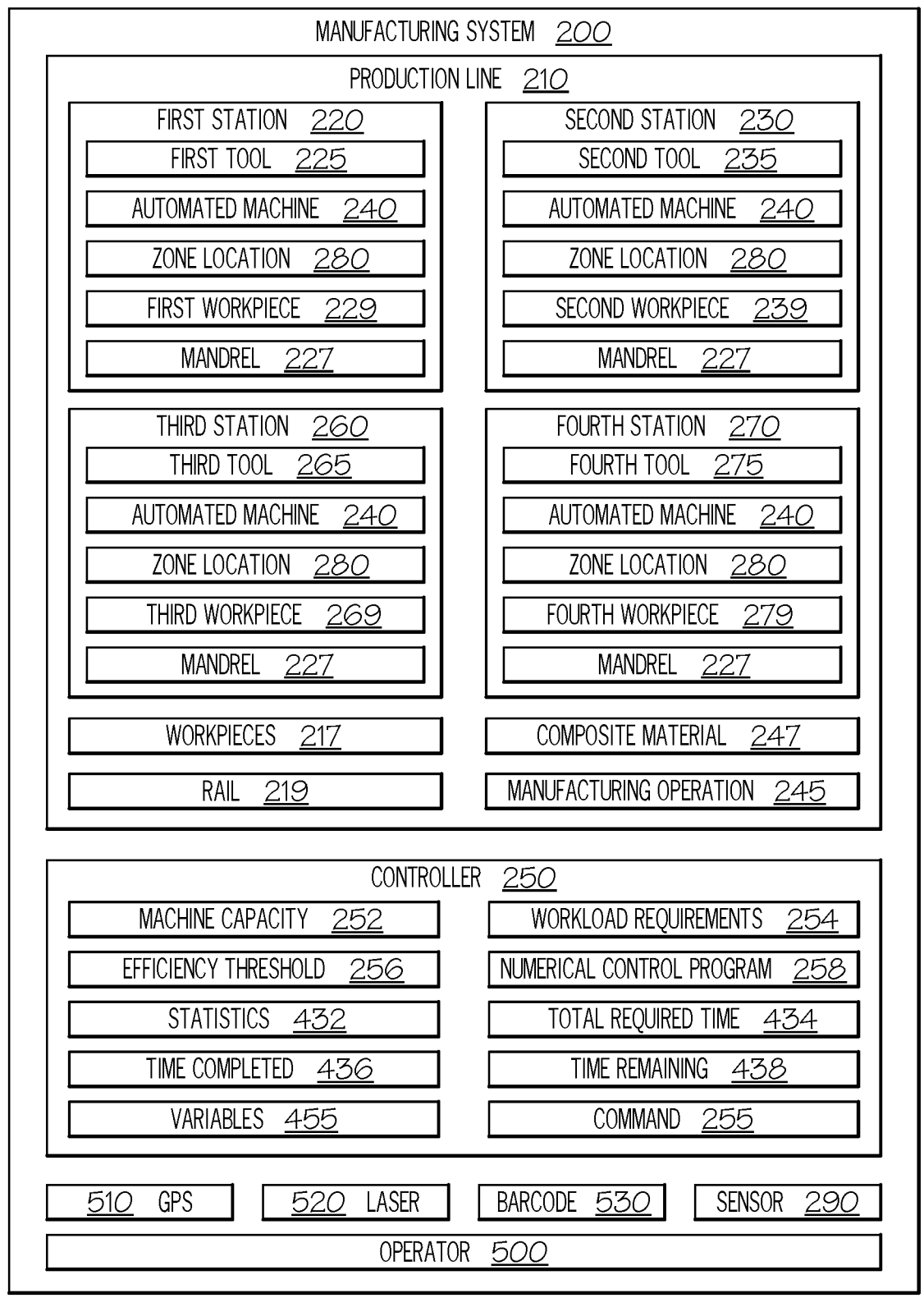
FIG. 7 is a block diagram of a system that can be used with the method of FIG. 5.

FIG. 7 illustrates an example of a system 300. In an example, a system 300 for distributing a plurality of automated machines 240 between multiple tools is disclosed. In an example, the automated machines 240a may be automated fiber placement machines configured to deposit composite material 247. The system 300 may include a production line 210. Production line 210 may include a first station 220 and a second station 230. First station 220 may house a first tool 225. First tool 225 may be a mandrel 227. The mandrel 227 may be configured to hold a first workpiece 229. First workpiece 229 may be a fuselage section, wing structure, or any other aircraft structure. First workpiece 229 may be comprised of a plurality of plies of composite material 247 at various orientations as determined by one or more numerical control programs 258. First workpiece 229 may include one or more zone location 280. At least one automated machine 240 may be temporarily dedicated to each zone location 280 on first workpiece 229.

Second station 230 may house a second tool 235. The second tool 235 may be a mandrel 227. The mandrel 227 may be configured to hold a second workpiece 239. Second workpiece 239 may be a fuselage section, wing structure, or any other aircraft structure. Second workpiece 239 may be comprised of a plurality of plies of composite material 247 at various orientations as determined by one or more numerical control programs 258. Second workpiece 239 may include one or more zone location 280. At least one automated machine 240 may be temporarily dedicated to each zone location 280 on second workpiece 239.

In an example, the system 300 includes a controller 250. Controller 250 may be configured to compile statistics 432 for the first station 220 and the second station 230, and to compare variables 455 of the plurality of automated machines 240. The statistics 432 may be comprised of total required time 434, time completed 436, time remaining 438, and zone location 280. Zone location 280 may be defined by any portion of a workpiece 217 to receive composite material 247.

In an example, the system 300 includes a third station 260 housing a third tool 265. The third tool 265 may be a mandrel 277. The mandrel 227 may be configured to hold a third workpiece 299. Third workpiece 269 may be a fuselage section, wing structure, or any other aircraft structure. Third workpiece 269 may be comprised of a plurality of plies of composite material 247 at various orientations as determined by one or more numerical control programs 258. Third workpiece 269 may include one or more zone location 280. At least one automated machine 240 may be temporarily dedicated to each zone location 280 on third workpiece 269.

Third station 260 may include at least one of a plurality of automated machines 240. The at least one automated machine 240a of the plurality of automated machines 240 may be an automated fiber placement machine configured to deposit composite material 247 on the third tool 265. Third station 260 may include one or more sensors 290. The one or more sensors 290 may be located on an automated machine 240, third tool 265, or anywhere throughout the third station 260. In an example, the one or more sensors 290 may be in communication with a controller 250.

In an example, the system 300 includes a fourth station 270. The fourth station 270 may be configured to house a fourth tool 275. Fourth tool 275 may be a mandrel 227. The mandrel 227 may be configured to hold a fourth workpiece 279. Fourth workpiece 279 may be a fuselage section, wing structure, or any other aircraft structure. Fourth workpiece 279 may be comprised of a plurality of plies of composite material 247 at various orientations as determined by one or more numerical control programs 258. Fourth workpiece 279 may include one or more zone location 280. At least one automated machine 240 may be temporarily dedicated to each zone location 280 on fourth workpiece 279.

Fourth station 270 may include at least one of a plurality of automated machines 240. The at least one automated machine 240a of the plurality of automated machines 240 may be an automated fiber placement machine configured to deposit composite material 247 on the fourth tool 275. Fourth station 270 may include one or more sensors 290. The one or more sensors 290 may be located on an automated machine 240, a fourth tool 275, or anywhere throughout the fourth station 270. In an example, the one or more sensors 290 may be in communication with the controller 250.

In an example, the controller 250 of system 300 may be configured to compile statistics 432 for the first station 220, the second station 230, the third station 260, and the fourth station 270. The controller 250 may further be configured to compare variables 455 of the plurality of automated machines 240 dispersed throughout the production line 210.

The statistics 432 may be comprised of total required time 434, time completed 436, time remaining 438, and zone location 280. Zone location 280 may be defined by any portion of a workpiece 217 to receive composite material 247.

In an example, the variables 455 include the number of automated machines 240 that are dedicated to a specific station, i.e. first station 220, second station 230, third station 260, fourth station 270, or any of the plurality of stations 215. The variables 455 may include the number of automated machines 240a that are movable between any of the plurality of stations 215 including first station 220, second station 230, and third station 260. In an example, the variables 455 include zone location 280 of each of the plurality of automated machines 240. Zone location 280 may be determined by a numerical control program 258 or manually by an operator 500. The variables 455 may include the number of automated machines 240a that are active and inactive. An automated machine 240 is considered active when it is performing at least one manufacturing operation 245. Variables 455 may include the percent of workload requirements 254 completed. Workload requirements 254 may be determined based upon one or more numerical control program 258, instructions from an operator 500, data collected from one or more sensors 290, data collected from a laser 520, data collected from a GPS 510, data collected from a barcode 530, or any combination thereof.

Figure 8:
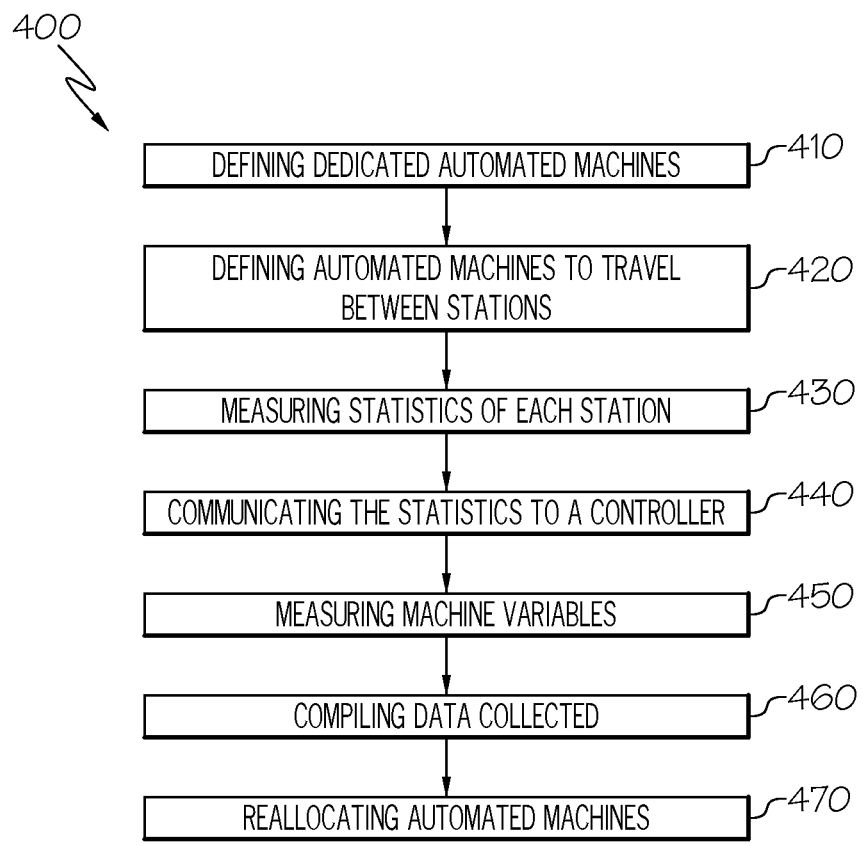
FIG. 8 is a flowchart illustrating a process for distributing automated machines between a plurality of tools.

FIG. 8 illustrates a flowchart of an example of a process 400 for distributing a plurality of automated machines 240 between a plurality of tools 295. In an example, the plurality of automated machines 240 are automated fiber placement machines. The plurality of tools 295 may include a first tool 225, a second tool 235, a third tool 265 and a fourth tool 275. The process 400 may include defining 410 automated machines 240a dedicated to a specific station, i.e. first station 220, second station 230, third station 260, fourth station 270, or any other of a plurality of stations 215. Defining 410 may be based upon the minimum number of automated machines 240 or minimum workload requirements 254. In an example, workload requirements 254 may be based upon several factors including the particular workpieces 217, one or more numerical control programs 258, and instructions manually entered from an operator 500.

In an example, the process 400 includes defining 420 one or more automated machines 240a configured to travel or move between the plurality of stations 215, including first station 220, second station 230, third station 260, and fourth station 270. The number of automated machines 240a of the plurality of automated machines 240 configured to travel between the plurality of stations 215 may be based upon the number of automated machines 240a needed to complete the workload requirements 254, which may be based upon the maximum difference in workload requirements 254 between two or more adjacent stations, i.e. first station 220, second station 230, third station 260, and fourth station 270. In an example, at least one of the plurality of automated machines 240 may be movable between different zone locations 280 located on the workpieces 217.

In an example, the process 400 includes measuring 430 statistics 432, see FIG. 6, of each of the plurality of stations 215, i.e. first station 220, second station 230, third station 260, and fourth station 270 and each tool, i.e. first tool 225, second tool 235, third tool 265, and fourth tool 275 located in each respective station. Measuring 430 statistics 432 may be accomplished by use of one or more sensors 290, GPS 510, laser 520, barcode 530, or any other means of collecting data. A controller 250 may be in communication with the one or more sensors 290, GPS 510, laser 520, barcode 530, or any other means of collecting data such that the controller 250 is configured to collect and analyze any data collected. Controller 250 may further be configured to determine an efficiency threshold 256 based upon the data collected. In an example, the measuring 430 statistics 432 includes measuring total required time 434, time completed 436, time remaining 438, and zone location 280. One or more automated machines 240a of the plurality of automated machines 240 may move between a zone location 280 and/or the plurality of stations 215 to balance out the workload requirements 254 thereof.

In an example, the process 400 includes communicating 440 the statistics 432 to the controller 250. In an example, communicating 440 may be done wirelessly. In an example, communicating 440 may be done manually via an operator 500. The statistics 432 may be comprised of total required time 434, time completed 436, time remaining 438, and zone location 280. Zone location 280 may be defined by any portion of a workpiece 217 to receive composite material 247.

In an example, the process 400 may include measuring 450 variables 455 from a numerical control program 258 in each automated machine 240a of the plurality of automated machines 240. Variables 455 may include the number of automated machines 240a of the plurality of automated machines 240 that are dedicated to a specific station, i.e. first station 220, second station 230, third station 260, or any of the plurality of stations 215. The variables 455 may include the number of automated machines 240a of the plurality of automated machines 240 that are movable between any of the plurality of stations 215 including first station 220, second station 230, and third station 260.

In an example, the variables 455 include zone location 280 of each of the plurality of automated machines 240. Zone location 280 may be determined by a numerical control program 258 or manually by an operator 500. The variables 455 may include the number of automated machines 240 that are active and inactive. An automated machine 240a is considered active when it is performing at least one manufacturing operation 245. Variables 455 may include the percent of workload requirements 254 completed. Workload requirements 254 may be determined based upon one or more numerical control program 258, instructions from an operator 500, data collected from one or more sensors 290, data collected from a laser 520, data collected from a GPS 510, data collected from a barcode 530, or any combination thereof.

In an example, the process 400 includes compiling data 460 measured of total machine capacity 252 and total workload requirements 254. Based upon the machine capacity 252 and workload requirements 254, an efficiency threshold 256 may be determined. The controller 250 may facilitate compiling data 460 including statistics 432. Statistics 432 may include measuring total required time 434, time completed 436, time remaining 438, and zone location 280 when analyzing monitored machine capacity 252 and workload requirements 254 to determine the efficiency threshold 256. A controller 250 may compile data collected related to machine capacity 252 and workload requirements 254, based upon one or more numerical control programs 258, to initiate movement of one or more automated machine 240a among the plurality of automated machines 240 and balance automated machine 240a distribution.

If it is determined that the efficiency threshold 256 has been met, the process 400 may include reallocating 470 one or more automated machines 240a of the plurality of automated machines 240 to a different zone location 280 or different station along the production line 210 that has unmet workload requirements 254.

In an example, first station 220 have three automated machines 240a depositing composite material 247 onto first tool 225 and second station may have six automated machines 240a depositing composite material onto second tool 235. Each of the automated machines 240a of the plurality of automated machines 240 may be assigned to a particular zone location 280. Each zone location 280 may have different shapes and configurations or may be generally the same. If one of the three automated machines in first station 220 has completed the workload requirements 254 for its assigned zone, controller 250 may reallocate that automated machine 240 to a different zone location 280 in first tool 225. Alternatively, controller 250 may reallocate that automated machine 240 to a zone location 280 located on second tool 235 in second station 230. The decisions of when to reallocate an automated machine 240a and where to reallocate that automated machine 240a are based upon the several determining factors discussed above including at least one or more of monitored capacity 252 and workload requirements 254, measured statistics 432, variables 455, manual instructions from an operator 500, and data collected from one or more global positioning systems (GPS) 510, sensors 290, lasers 520, numerical control programs 258, barcode 530, or any other suitable means of collecting machine capacity 252 and workload requirements 254 data for determining 120 an efficiency threshold 256 of optimal allocation of the plurality of automated machines 240.

In an example, an overall objective of collecting and compiling the data described above is to achieve efficiency throughout the production line 210 such that workpieces 217 may continuously move along the production line 210 and between the plurality of stations 215 while the plurality of automated machines 240 continuously conduct at least one manufacturing operation 245. Preferably, each automated machine 240a within the manufacturing system 200, system 300, method 100, and process 400 described above has little to no down time and is reallocated accordingly throughout the plurality of stations 215 along the production line 210 to efficiently manufacture each workpiece 217.

Figure 9:
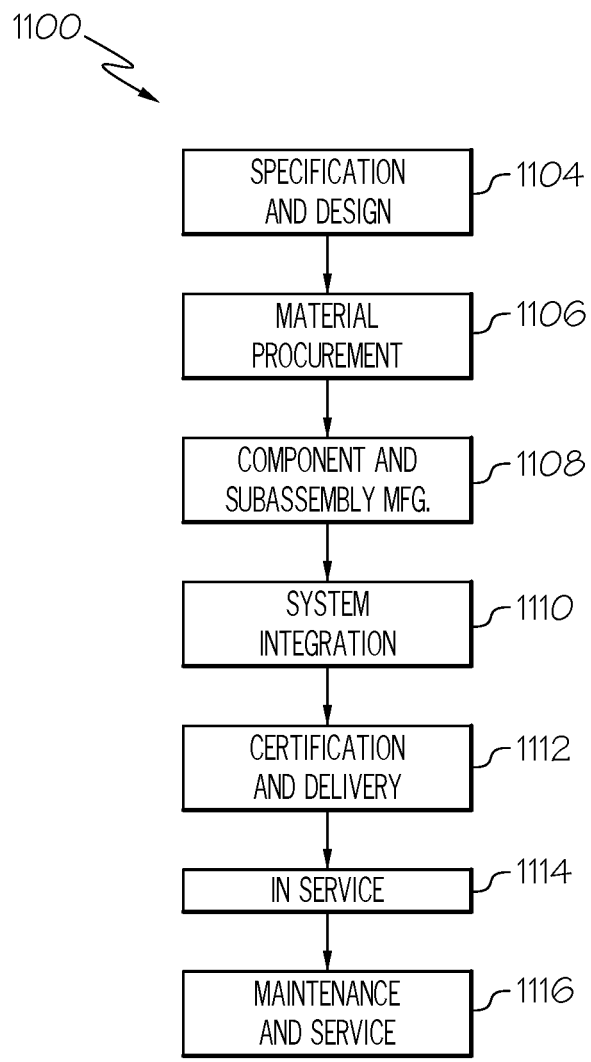
FIG. 9 is a flow diagram of an aircraft manufacturing and service methodology.
Figure 10:
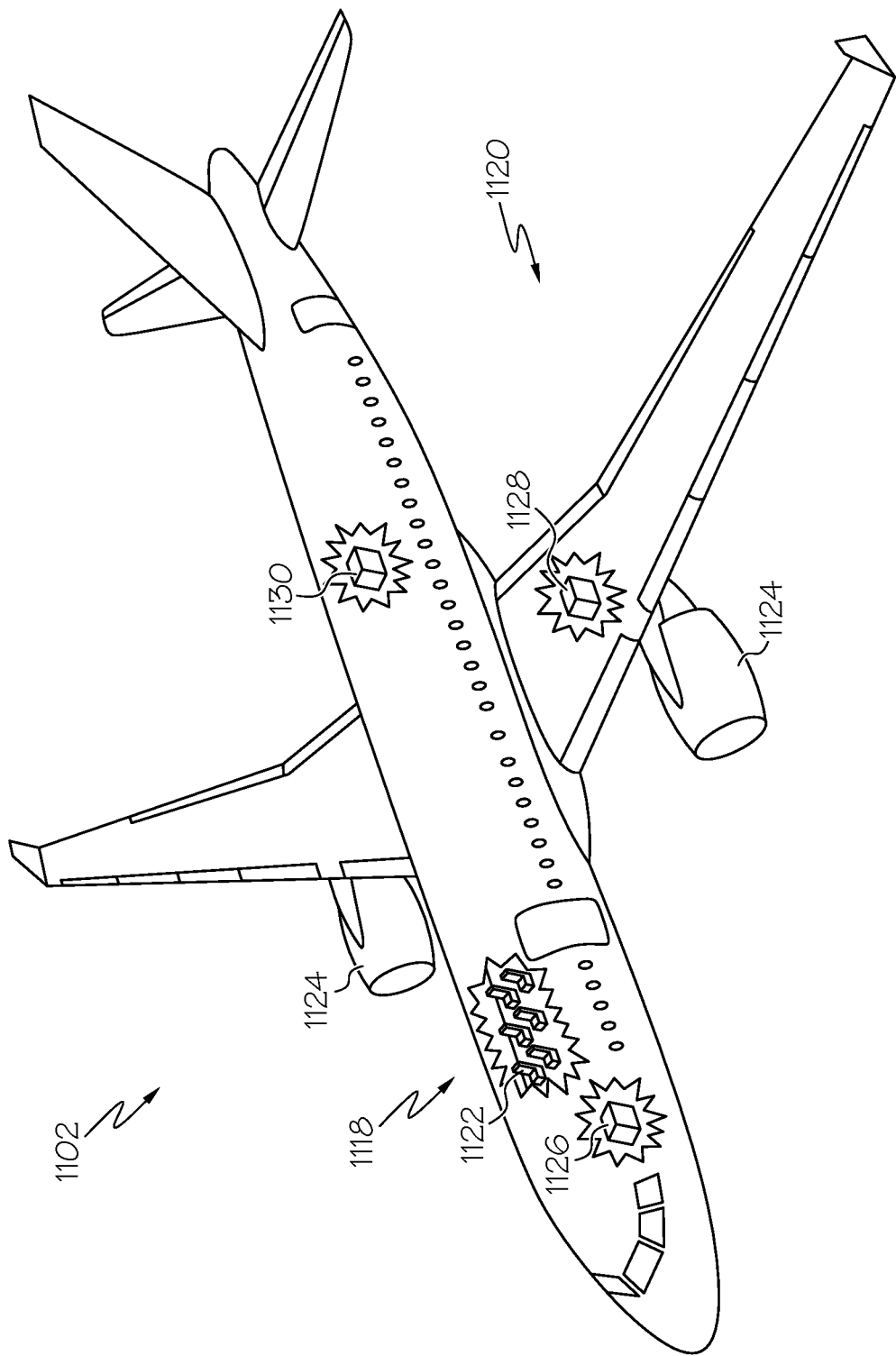
FIG. 10 is a block diagram of an aircraft.

Examples of the disclosure may be described in the context of an aircraft manufacturing and service method 1100, as shown in FIG. 9, and an aircraft 1102, as shown in FIG. 10. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the steps of method 1100 may be performed or carried out by a system integrator, a third party, and/or an operator 500 (e.g., a customer). For the purposes of this description, a system integrator may include without limitation any number of aircraft manufacturers and major-system subcontractors; a third party may include without limitation any number of venders, subcontractors, and suppliers; and an operator 500 may be an airline, leasing company, military entity, service organization, and so on.

As shown in FIG. 10, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems that may be used to manufacture an aircraft or aircraft component in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples.

Furthermore, although various examples of the manufacturing system, the process, and the method have been shown and described, modifications may occur to those skilled in the art upon reading the specification. The present application includes such modifications and is limited only by the scope of the claims.

What is claimed is:

1. A method for employing a plurality of automated machines to deposit composite material onto a first tool located in a first station and a second tool located in a second station, the first station and the second station being on a production line such that the first station comprises at least one automated machine of the plurality of automated machines and the second station comprises at least two automated machines of the plurality of automated machines, wherein one or more automated machine of the plurality of automated machines is movable between the second station and the first station, the method comprising:
   monitoring machine capacity and workload requirements of the plurality of automated machines;
   determining an efficiency threshold based upon the machine capacity and workload requirements; and
   reallocating a first automated machine of the at least two automated machines from the second station to the first station once the efficiency threshold is met.

2. The method of claim 1 wherein the first tool and the second tool move in pulses along the production line.

3. The method of claim 1 comprising a third station having a third tool.

4. The method of claim 1 wherein the plurality of machines deposit composite material while the first tool and the second tool move along the production line.

5. The method of claim 1 comprising implementing a numerical control program configured to monitor and allocate the plurality of automated machines across the first station and the second station.

6. A manufacturing system comprising:
   a production line;
   a first station located on the production line;
   a first tool located in the first station;
   a second station located on the production line;
   a second tool located in the second station;
   a plurality of automated machines distributed between the first station and the second station such that the first station comprises at least two automated machines and the second station comprises at least one automated machine, at least one of the plurality of automated machines being movable between the first station and the second station; and
   a controller configured to monitor machine capacity and workload requirements of the plurality of machines, wherein the controller is configured to reallocate a first automated machine of the at least two automated machines from the first station to the second station based on the machine capacity and workload requirements.

7. The manufacturing system of claim 6 wherein the plurality of automated machines are automated fiber placement machines.

8. The manufacturing system of claim 6 wherein the controller reallocates one or more of the plurality of machines based upon monitored capacity and workload requirements.

9. The manufacturing system of claim 6 wherein the production line comprises a rail.

10. The manufacturing system of claim 6 comprising a third tool in a third station located on the production line.

11. The manufacturing system of claim 6 wherein the controller reallocates the automated machines based upon a numerical control program.

12. The manufacturing system of claim 6 wherein the first tool and the second tool move in pulses along the production line.

13. A system for fabrication using multiple stations, the system comprising:
- a production line comprising a first station comprising a first tool and a second station comprising a second tool;
- a plurality of automated machines distributed between the first station and the second station such that the first station comprises at least one automated machine and the second station comprises at least two automated machines; and
- a controller configured to determine a location of the plurality of automated machines based upon compiled statistics for the first station and the second station, and further configured to compare variables of the plurality of automated machine;
- wherein the compiled statistics comprise total required time, time completed, time remaining, and zone location.

14. The system of claim 13 wherein the variables comprise:
- number of automated machines that are dedicated to a specific station;
- number of automated machines that move between stations;
- zone location of each automated machine;
- number of automated machines that are active and inactive; and
- percent of workload requirements completed.

15. The system of claim 13 wherein the automated machines are automated fiber placement machines.

16. A process for distributing a plurality of automated machines between a plurality of tools, the process comprising:
- defining a first automated machine set among the plurality of automated machines dedicated to one or more of a plurality of stations, based on a minimum number of automated machine requirements or minimum workload requirements;
- defining a second automated machine set among the plurality of automated machines configured to travel between the plurality of stations to complete total workload requirements based on a maximum difference in station-level workload requirements between two or more adjacent stations of the plurality of stations;
- measuring statistics of each station of the plurality of stations and tool;
- communicating the statistics to a controller;
- measuring variables from a numerical control program in each automated machine of the plurality of automated machines;
- compiling data measured of a total machine capacity and the total workload requirements across each station of the plurality of stations; and
- reallocating one or more of the plurality of automated machines to at least one of the plurality of stations that has unmet workload requirements.

17. The process of claim 16 wherein the measuring the statistics comprise measuring total required time, time completed, time remaining, and zone location.

18. The process of claim 16 wherein the measuring the variables comprises measuring:
- number of automated machines in the first automated machine set;
- number of automated machines in the second automated machine set;
- zone location of each automated machine of the plurality of automated machines;
- number of active automated machines and inactive automated machines among the plurality of automated machines; and
- percent of the total workload requirements completed.

* * * * *